(12) United States Patent
Oroskar et al.

(10) Patent No.: US 9,820,203 B1
(45) Date of Patent: Nov. 14, 2017

(54) ASSIGNING A UE TO A CARRIER BASED ON THE UE PING-PONGING BETWEEN BASE STATIONS

(71) Applicant: Sprint Spectrum L.P., Overland Park, KS (US)

(72) Inventors: Siddharth S. Oroskar, Overland Park, KS (US); Jasinder P. Singh, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 15/163,504

(22) Filed: May 24, 2016

(51) Int. Cl.
    *H04W 36/00* (2009.01)
    *H04W 36/16* (2009.01)
    *H04W 72/04* (2009.01)

(52) U.S. Cl.
    CPC ..... *H04W 36/165* (2013.01); *H04W 72/0453* (2013.01)

(58) Field of Classification Search
    None
    See application file for complete search history.

(56) References Cited

U.S. PATENT DOCUMENTS

| 2012/0028627 | A1* | 2/2012 | Hunzinger | H04W 36/0083 455/422.1 |
| 2014/0155065 | A1* | 6/2014 | Centonza | H04W 36/0066 455/436 |
| 2014/0301371 | A1* | 10/2014 | Maeda | H04W 36/0011 370/331 |

* cited by examiner

*Primary Examiner* — Idowu O Osifade

(57) ABSTRACT

A method for controlling a UE situated in both a coverage area of a first base station and a coverage area of a second base station involves detecting that the UE is ping-ponging between being served by the first base station and being served by the second base station and determining that the second base station is a relay base station. Further, the method involves, responsive to detecting the ping-ponging and determining that the second base station is a relay base station, (a) determining a carrier on which the first base station provides service and on which the second base station does not provide service, and (b) based on the first base station providing service on the determined carrier and the second base station not providing service on the determined carrier, causing the UE to be served by the first base station on the determined carrier.

20 Claims, 4 Drawing Sheets

ASSIGNING A UE TO A CARRIER BASED ON THE UE PING-PONGING BETWEEN BASE STATIONS

BACKGROUND

A typical wireless network includes a number of base stations each radiating to provide coverage in which to serve user equipment devices (UEs) such as cell phones, tablet computers, tracking devices, embedded wireless modules, and other wirelessly equipped devices, whether or not user operated. In turn, each base station may be coupled with a switch or gateway that provides connectivity with one or more transport networks, such as the public switched telephone network (PSTN) and/or the Internet for instance. With this arrangement, a UE within coverage of the network may engage in air interface communication with a base station and may thereby communicate via the base station with various remote network entities or with other UEs served by the network.

Further, such a network may operate in accordance with a particular radio access protocol, examples of which include, without limitation, Orthogonal Frequency Division Multiple Access (OFDMA) (e.g., Long Term Evolution (LTE) and Wireless Interoperability for Microwave Access (WiMAX)), Code Division Multiple Access (CDMA) (e.g., 1xRTT and 1xEV-DO), Global System for Mobile Communications (GSM), IEEE 802.11 (WiFi), BLUETOOTH, and others. Each protocol may define its own procedures for registration of UEs, initiation of communications, handover between base station coverage areas, and other functions.

Each base station may provide wireless service to UEs on one or more carrier frequencies (carriers), each of which could be frequency division duplex (FDD), defining separate frequency channels for downlink and uplink communication, or time division duplex (TDD), defining a frequency channel multiplexed over time between downlink and uplink use. Each carrier or its respective channels could be within a defined frequency band and could be of a particular frequency bandwidth, such as 5 MHz, 10 MHz, or 20 MHz for instance, defining a certain extent of air interface resources. A given base station could be arranged to serve a UE on a single such carrier at a time or, with carrier aggregation service or the like, on multiple such carriers at a time.

Further, each base station in such a network may be communicatively linked with a signaling controller that carries out various network control functions, such as managing setup of bearer connections between the base station and one or more transport networks, tracking where UEs are located in the network, paging UEs, and the like. In addition, neighboring base stations may be communicatively linked with each other to facilitate handover and other inter-base station signaling.

By way of example, in an LTE network, each base station (LTE evolved Node-B (eNodeB)) has a communication interface with a signaling controller known as a mobility management entity (MME). The base station and MME each also have a respective communication interface with a gateway system that provides connectivity with a packet-switched transport network, and the base station has a communication interface with each of its neighboring base stations. Typically, the nodes of such an LTE network would sit on a wireless service provider's core packet-switched network (e.g., a network compliant with the industry standard system architecture evolution (SAE) for the LTE protocol), and so the base station and each other network entity (e.g., MME, gateway, and neighboring base station) may each have an assigned Internet Protocol (IP) address on that network, and the interfaces between these entities may be defined as logical connections (e.g., established virtual tunnels) through that network.

In example operation, when a UE enters into coverage of an LTE base station on a particular carrier, the UE signals to the base station to initiate an attach process and to establish a radio-link-layer connection with the base station. In this process, the base station signals to the MME, the MME authenticates the UE, the MME and base station obtain and store a context/profile record for the UE, and the gateway system assigns an IP address to the UE for use by the UE to communicate on the packet-switched transport network. Further, at this point or later, the MME may engage in signaling with the base station and the gateway system to establish for the UE one or more bearers for carrying packet data between the UE and the transport network. Each such bearer may have an associated quality of service (QoS) level indicated by a QoS class identifier (QCI) value, and packets transmitted on a given bearer could be tagged with the QCI value or a corresponding differentiated services code point (DSCP) value, so that network entities can route and otherwise handle the packets with an appropriate QoS level (e.g., with appropriate routing priority, etc.)

Once a UE is so attached with a base station, the base station then serves the UE on one or more carriers, managing downlink communication of packet data to the UE and uplink communication of packet data from the UE. For example, as the gateway system receives packet data destined to the UE, the gateway system may forward the packet data to the base station, and the base station may schedule and provide transmission of that data to the UE on the UE's serving carriers. Likewise, as the UE has packet data to transmit on the transport network, the UE may transmit a scheduling request to the base station, the base station may schedule transmission of that data from the UE on the UE's serving carriers, the UE may accordingly transmit the data to the base station, and the base station may then forward the data to the gateway system for output on the transport network.

Optimally, a wireless service provider will strategically implement base stations throughout a market area so that served UEs can move between the base station coverage areas without loss of coverage. Each base station may include an antenna structure and associated equipment, and the wireless service provider may connect the base station by a landline cable (e.g., a T1 line) with the service provider's network infrastructure to enable the base station to communicate with a signaling controller (e.g., MME), gateway system, other base stations, and the like.

In practice, however, it may be impractical for a wireless service provider to run landline connections to base stations in certain locations. For instance, where a service provider seeks to provide many small coverage areas blanketing a market area or to fill in coverage holes between coverage of other base stations, the service provider may implement many small-cell base stations throughout the market area, but it may be inefficient or undesirable to run landline cables to every one of those small-cell base stations.

To connect a base station with the network infrastructure in such a situation, the wireless service provider may implement a wireless backhaul connection between the base station and another base station of the service provider's network. In this situation, the base station at issue operates as a relay base station, and the other base station operates as a donor base station. In practice, the relay base station includes or is coupled (e.g., via a local area network or other connection) with a UE, referred to as a relay-UE, and the donor base station then serves the relay-UE in much the same way that the donor base station serves other UEs. Further, the relay base station itself serves UEs, in much the same way that any base station would.

With this arrangement, when the relay-UE attaches with the donor base station, the relay-UE may acquire connectivity and an IP address as discussed above for instance. But based on a profile record for the relay-UE, the network (e.g., a signaling controller) may recognize that the relay-UE is a relay-UE (rather than a normal end-user UE) and may therefore set up a bearer connection for that relay-UE with a special gateway system that provides for internal core network connectivity and assigns the relay-UE with an IP address for use to communicate within the core network. Once the relay-UE receives that core network IP address assignment, the relay-UE may then convey that IP address to the relay base station for use by the relay base station as the relay base station's IP address on the core network. The relay base station may then operate as a full-fledged base station of the network, having IP-based interfaces with other core network entities (e.g., a signaling controller, a gateway system, and other base stations), albeit with those interfaces passing via the wireless backhaul connection provided by the relay-UE, and via the special gateway system.

Once the relay base station is thus in operation, the relay base station may then serve UEs in the same way as a standard base station serves UEs. Thus, when a UE enters into coverage of the relay base station, the UE may signal to the relay base station to initiate an attach process, the UE may acquire an IP address, and an MME may engage in signaling to establish one or more bearers between the UE and a gateway system. Each of these bearers, though, like the relay base station's signaling communication, would pass via the relay's wireless backhaul connection.

Moreover, when a UE is served by a base station, regardless of whether the base station is a relay base station or a standard base station, the UE may regularly monitor the reference signal from that base station and reference signals from other base stations in the vicinity, to help ensure that the UE continues to operate in a most appropriate coverage area (e.g., in a coverage area with the strongest signal strength). If the UE finds that one or more other base stations provide sufficiently strong coverage, perhaps sufficiently stronger than the UE's currently serving base station, then the UE may initiate handover. For instance, the UE may transmit to its serving base station a measurement report that specifies the one or more detected coverage areas and, for each such coverage area, the detected signal strength. The serving base station (source base station) and/or associated network infrastructure may then decide based on the UE's measurement report to process a handover of the UE to a particular base station (target base station) from which the UE detected sufficiently strong signal strength.

In an example handover process, the source base station may direct the UE to transition to be served by the target base station, and the UE may then engage in control channel signaling with the target base station in order to transition from having a radio-link-layer connection with the source base station to having a radio-link-layer connection with the target base station. For instance, in response to a radio-link-layer control message from the source base station, the UE may transmit to the target base station, on a random-access channel, an access request, and the target base station may receive that access request and transmit to the UE an access response. Once the UE receives that access response, the UE may then transmit to the target base station a radio-link-layer control message to complete transition of the UE from having a radio-link-layer connection with the source base station to having a radio-link-layer connection with the target base station.

When a UE is located near a border between neighboring base station coverage areas, the strength of signals from the base stations may fluctuate as a result of the UE physically changing locations or as a result of fluctuations in the signal strengths of the coverage areas due to variations in network load or other factors. Such signal strength fluctuations may cause the UE to "ping-pong" between being served by the neighboring base stations, during which the UE is repeatedly handed off from being served by one base station to being served by another. Each time the UE is handed off between base stations, the base stations may engage in inter-base station control channel signaling as described above.

OVERVIEW

When a UE is ping-ponging between being served by neighboring base stations, the base stations repeatedly engage in inter-base station control channel signaling, which may be particularly problematic where one of the neighboring base stations is a relay base station. For instance, when the ping-ponging involves a relay base station, the inter-base station control channel signals sent to and from the relay base station are passed over a wireless backhaul connection provided by a relay-UE served by a donor base station. The carrier on which the donor base station serves the relay-UE and perhaps other UEs may have a limited load capacity (e.g., the extent of communication data per unit time), and repeatedly passing control channel signaling over the wireless backhaul connection may cause this carrier to become heavily loaded.

Heavily loading the carrier on which the donor base station serves the relay-UE could pose a special problem for communications that flow via that carrier between the relay base station and other core network entities. For instance, the heavy load could cause delays in scheduling of those communications, which could in turn lead to delays in handover, paging, bearer setup, or the like, and those delays could then lead to poor user experience. By way of example, heavy load on the carrier could result in delays in transmission of handover setup signaling between the relay base station and adjacent base stations, which could lead to dropped calls or other issues. And as another example, heavy load on the carrier could result in delays in transmission of handover signaling or bearer-setup signaling between the relay base station and the MME, which could lead to dropped or blocked calls or other issues as well.

Disclosed herein is a method and system that may help to address this or other issues. In accordance with the disclosure, when a base station serving a UE determines that the UE is ping-ponging between being served by the base station and being served by a neighboring relay base station, the base station responsively determines a carrier on which the base station provides service and on which the neighboring relay base station does not provide service and causes the UE to be served by the base station on that carrier.

Accordingly, in one respect, disclosed is a method for controlling a UE, where the UE is situated in both a coverage area of a first base station and a coverage area of a second base station. In accordance with the disclosure, the method involves detecting that the UE is ping-ponging between being served by the first base station and being served by the second base station and determining that the second base station is a relay base station. Further, the method involves, responsive to detecting the ping-ponging and determining that the second base station is a relay base station, (a) determining a carrier on which the first base station provides service and on which the second base station does not provide service, and (b) based on the first base station providing service on the determined carrier and the second base station not providing service on the determined carrier, causing the UE to be served by the first base station on the determined carrier.

In another respect, disclosed is a base station that is configured to serve a UE over an air interface. In accordance with the disclosure, the base station detects that the UE is ping-ponging between being served by the base station and being served by a different, neighboring base station, and the base station also determines that the neighboring base station is a relay base station. Further, responsive to detecting the ping-ponging, the base station (a) determines a carrier on which the base station provides service and on which the neighboring base station does not provide service, and (b) based on the neighboring base station being a relay base station and not providing service on the determined carrier, causes the base station to serve the UE on the determined carrier.

And in still another respect, disclosed is a system for controlling a UE. In accordance with the disclosure, the system includes a donor base station and a relay. Further, the relay comprises a relay-UE and a relay base station, and the donor base station serves the relay-UE over an air interface defining a wireless backhaul connection for the relay. Per the disclosure, the donor base station is configured to detect that the UE is ping-ponging between being served by the donor base station and being served by the relay base station. Responsive to detecting the ping-ponging, the donor base station is further configured to (a) determine a carrier on which the donor base station provides service and on which the relay base station does not provide service, and (b) based on the relay base station not providing service on the determined carrier, cause the UE to operate on the determined carrier.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

The present method and apparatus will be described herein in the context of LTE as an example radio access protocol and associated network arrangement. However, it will be understood that principles of the disclosure can extend to apply in other scenarios as well, such as with respect to other radio access protocols. Further, even within the context of LTE, numerous variations from the details disclosed herein may be possible. For instance, elements, arrangements, and functions may be added, removed, combined, distributed, or otherwise modified. In addition, it will be understood that functions described here as being performed by one or more entities may be implemented in various ways, such as by a processing unit executing software instructions for instance.

Figure 1:
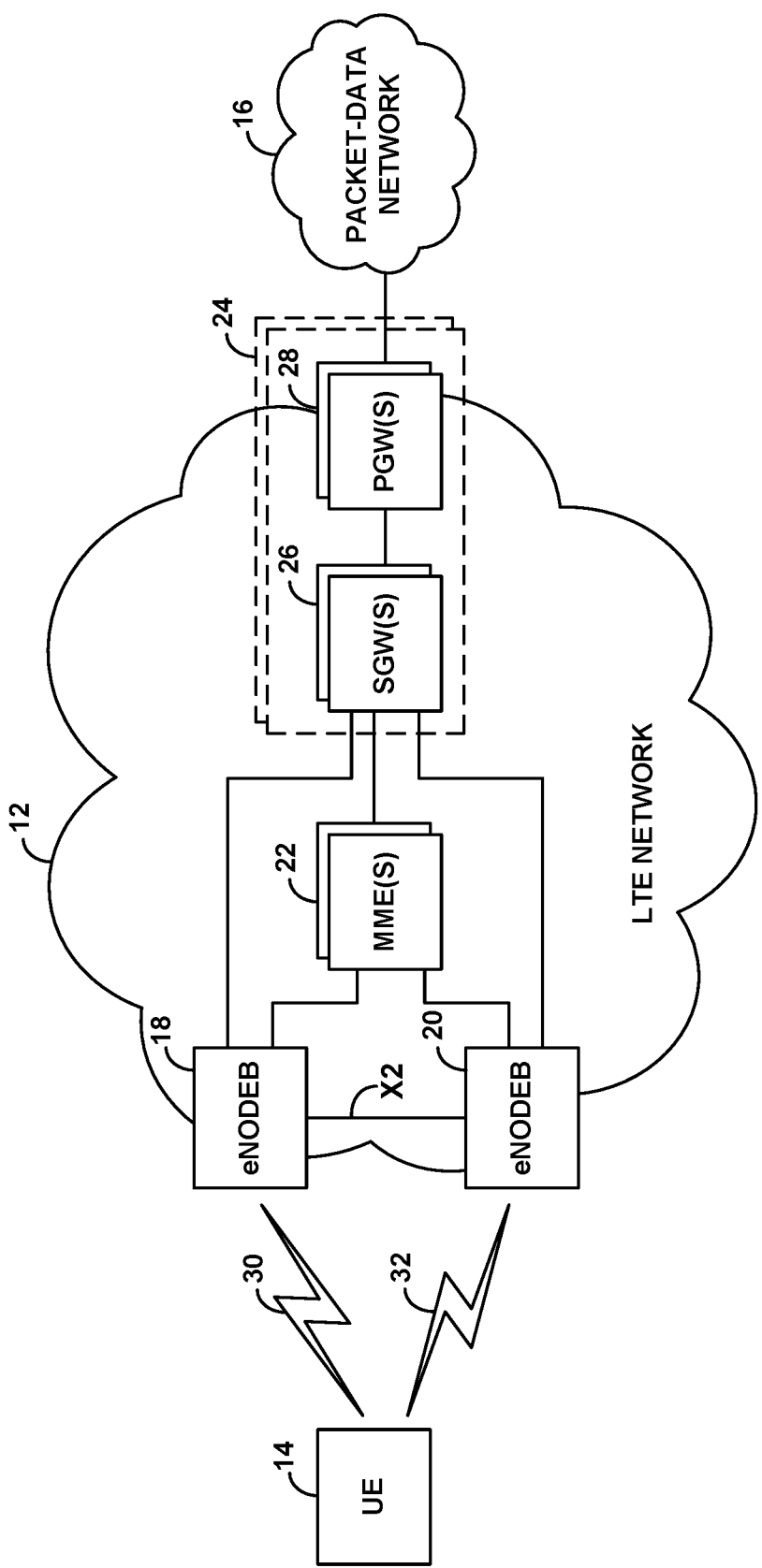
FIG. 1 is a simplified block diagram of an example wireless communication system.

Referring to the drawings, as noted above, FIG. 1 is a simplified block diagram of a wireless communication system in which the present method and system can be implemented. In particular, FIG. 1 depicts a representative LTE network 12, which functions primarily to serve UE 14 with wireless packet data communication service, enabling UE 14 to communicate on an external packet data network 16.

In LTE network 12, each base station is referred to as an evolved Node-B or eNodeB. As shown in FIG. 1, example LTE network 12 includes a first eNodeB 18, a second eNodeB 20, one or more MMEs 22, and one or more gateway systems 24 including one or more serving gateways (SGWs) 26 and one or more packet data network gateways (PGWs) 28 that provide connectivity with the external packet data network 16. As noted above, the entities of LTE network 12 may sit as nodes on a core packet-switched network and may thus each have an IP address on that network.

Each eNodeB within the LTE network 12 may radiate to provide a respective coverage area (e.g., LTE cell), and representative UE 14 may be positioned within coverage of the various eNodeBs. With this arrangement, we may assume that UE 14 is attached with eNodeB 18 and is thus being served with wireless communication service by eNodeB 18 over air interface 30. As such, we may assume that UE 14 has worked with eNodeB 18 to establish a Radio Resource Control (RRC) connection defining a radio-link-layer connection between UE 14 and eNodeB 18, and that at least one logical bearer has been established between UE 14 and a PGW 28, with the bearer including a radio portion extending between UE 14 and eNodeB 18 and an access portion extending between eNodeB 18 and the PGW 28 via an SGW 26. Further, we may assume that, as UE 14 is served by eNodeB 18, UE 14 regularly monitors a downlink reference signal from eNodeB 18 and from each other eNodeB (e.g., eNodeB 20) that UE 14 can detect.

In line with the discussion above, when UE 14 detects sufficiently strong coverage from eNodeB 20, such as coverage sufficiently stronger than that of serving eNodeB 18, UE 14 may transmit a measurement report to eNodeB 18 to trigger possible handover. Under LTE, if source eNodeB 18 determines that the reported signal strength of target eNodeB 20 is sufficient, then source eNodeB 18 may transmit a handover request via an inter-eNodeB "X2" interface to target eNodeB 20 to prepare target eNodeB 20 to receive handover of UE 14. Upon preparing for handover of UE 14, target eNodeB 20 then transmits to source eNodeB 18 a handover request acknowledge message that carries information including a C-RNTI identifier for use by UE 14 to engage in communication with target eNodeB 20. Source eNodeB 18 then transmits that information to UE 14 in an RRC connection reconfiguration message that essentially functions as a handover directive to cause UE 14 to hand over to target eNodeB 20.

As further discussed above, UE 14 may then engage in a random-access process with target eNodeB 20 followed by further signaling to complete transition of UE 14 from being connected with source eNodeB 18 to being connected with target eNodeB 20. To facilitate random-access signaling, the uplink air interface to target eNodeB 20 may have certain random access channel (RACH) instances defined at particular times and frequency segments for carrying random-access request messages from UEs. Each such RACH instance may be a particular sub-frame or timeslot (half sub-frame) in a periodically recurring radio frame, so that target eNodeB 20 knows when the RACH instances occur. When UE 14 wishes to gain access to communicate with target eNodeB 20, UE 14 then randomly selects a RACH preamble from a group of defined preambles and transmits the selected preamble in any such RACH instance to target eNodeB 20. Upon receipt of the preamble, without knowing which UE transmitted it, target eNodeB 20 then determines a timing advance for UE 14 based on the delay in target eNodeB's 20 receipt of the UE's preamble compared with when the RACH instance was defined. And target eNodeB 20 then transmits an access response message corresponding with the chosen preamble, specifying in the access response message the determined timing advance.

Upon completion of the random-access process, UE 14 then transmits to target eNodeB 20 an RRC connection reconfiguration complete message carrying the provided C-RNTI, and target eNodeB 20 verifies the C-RNTI, completing the process of transitioning UE 14 from having a radio-link-layer connection with source eNodeB 18 to having a radio-link-layer connection with target eNodeB 20. Further, target eNodeB 20 transmits a path-switch request message to an MME 22 to signal a change in cell of UE 14, and the MME 22 engages in signaling with SGW 26 to cause SGW 26 to switch one or more logical connections for UE 14 to be with target eNodeB 20 instead of source eNodeB 18. Target eNodeB 20 may then proceed to serve UE 14 over air interface 32, including scheduling bearer communications to and from UE 14, with UE 14 using its established timing advance to time uplink transmissions to target eNodeB 20.

Further in line with the discussion above, UE 14 may ping-pong between being served by eNodeB 18 and being served by eNodeB 20 when UE 14 is located within coverage areas of eNodeB 18 and eNodeB 20. In this arrangement, UE 14 regularly monitors a downlink reference signal from eNodeB 18 and from eNodeB 20. Due to variations in the signal strength of the monitored reference signals, UE 14 may ping-pong between being served by eNodeB 18 and being served by eNodeB 20.

For instance, when UE 14 is located near a border between coverage areas of eNodeB 18 and eNodeB 20, the respective signal strengths of the monitored reference signals may fluctuate as a result of UE 14 physically changing location or as a result of variations in network load or other factors. Such fluctuations may result in UE 14 detecting a reference signal from eNodeB 20 that is stronger than that of eNodeB 18 at a given moment and detecting a reference signal from eNodeB 18 that is stronger than that of eNodeB 20 at a time shortly thereafter. If the fluctuations in signal strength are sufficiently large, then UE 14 may ping-pong (i.e., be repeatedly handed over) between being served by eNodeB 18 and being served by eNodeB 20. Each time UE 14 is handed over between eNodeB 18 and eNodeB 20, the eNodeBs engage in the inter-eNodeB handover communications via the X2 interface as described above.

Figure 2:
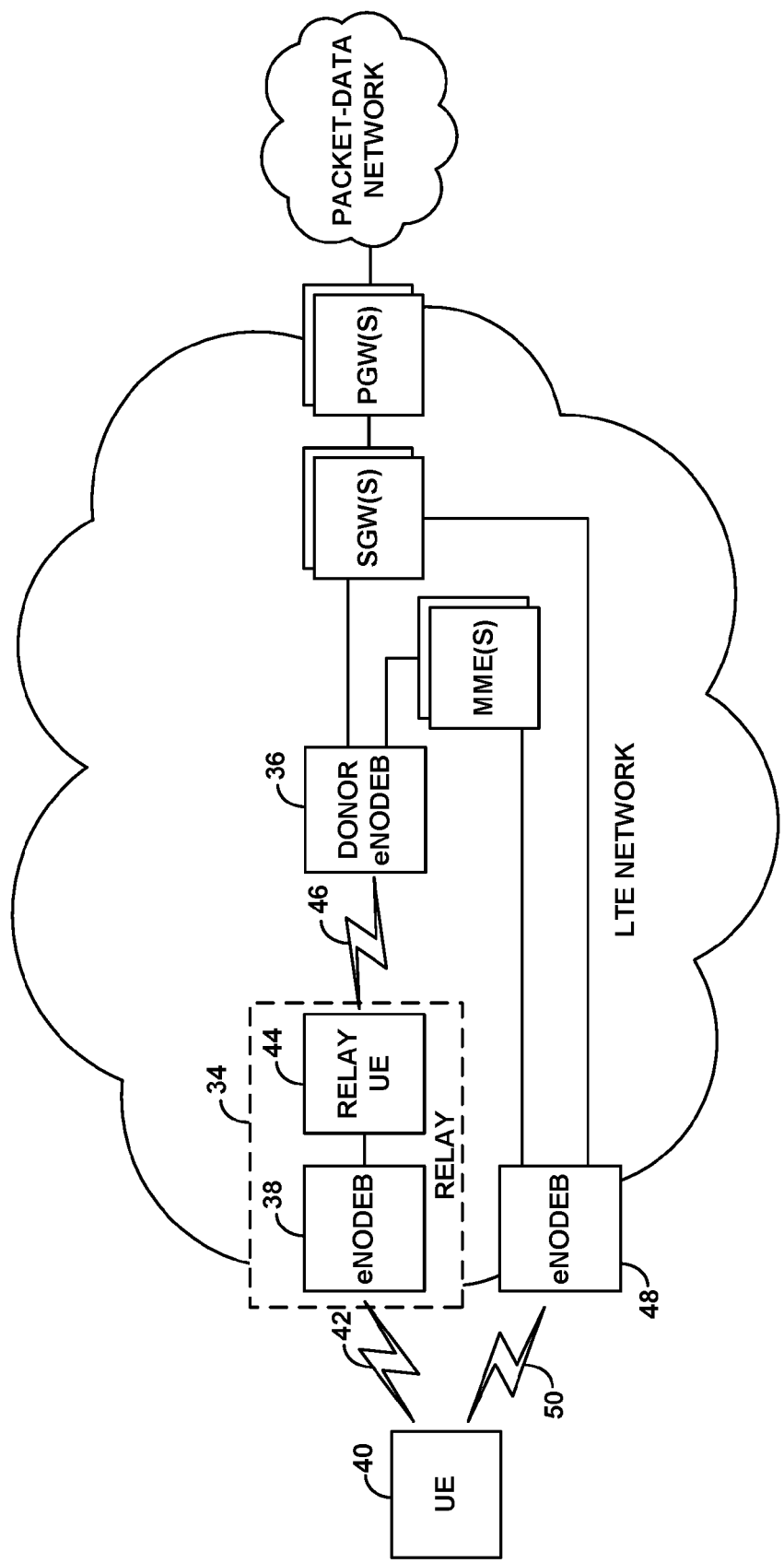
FIG. 2 is a simplified block diagram of an example wireless communication system including a relay.

Turning next to FIG. 2, an alternative arrangement of the wireless communication system of FIG. 1 is shown. In this alternative arrangement, the LTE network additionally includes relay 34, which has a wireless backhaul connection with donor eNodeB 36. In particular, relay 34 includes relay eNodeB 38 configured to serve UE 40 over air interface 42 much like eNodeB 18 discussed above, and relay 34 further includes relay-UE 44 that is attached with and served by donor eNodeB 38 over air interface 46 defining the wireless backhaul connection.

With this arrangement, relay eNodeB 38 may engage in communication with various core network entities in the same way as eNodeB 18 would, but those communications would pass over the wireless backhaul connection provided between donor eNodeB 36 and relay-UE 44, and between relay-UE 44 and relay eNodeB 38. Thus, when relay eNodeB 38 engages in X2 communication with other core network entities as described above, those communications would pass via relay-UE 44, via the wireless backhaul communication over air interface 46, via donor eNodeB 36, and likely via a special relay gateway system in the core network. Further, with this arrangement, the communications passing over air interface 46 between donor eNodeB 36 and relay-UE 44 may additionally include communications with one or more UEs (e.g., UE 40) served by relay eNodeB 38.

In practice, when UE 40 is being served by relay eNodeB 38 over air interface 42 and UE 40 detects that a reference signal from eNodeB 48 is sufficiently stronger than that of serving relay eNodeB 38, UE 40 may transmit a measurement report to relay eNodeB 38 to trigger possible handover to eNodeB 48. Relay eNodeB 38 may then engage in X2 communication with eNodeB 48 via the wireless backhaul connection provided by relay-UE 44 and donor eNodeB 36. Similarly, when UE 40 is being served by eNodeB 48 over air interface 50 and UE 40 detects that a reference signal from relay eNodeB 38 is sufficiently stronger than that of serving eNodeB 48, UE 40 may transmit a measurement report to serving eNodeB 48 to trigger possible handover to relay eNodeB 38. Serving eNodeB 48 may then engage in X2 communication with relay eNodeB 38 via the wireless backhaul connection provided by relay-UE 44 and donor eNodeB 36.

Further, UE 40 may ping-pong between being served by relay eNodeB 38 and being served by eNodeB 48 due to UE 40 detecting fluctuations in signal strength from relay eNodeB 38 and eNodeB 48. When UE 40 is ping-ponging, the eNodeBs repeatedly engage in X2 communication via the wireless backhaul connection provided by relay-UE 44 and donor eNodeB 36 in order to facilitate handover of UE 40.

In practice, donor eNodeB 36 may have limited air interface resources on which to engage in communications with relay-UE 44. In particular, in line with the discussion above, donor eNodeB 36 may provide service on one or more carriers each having a defined, finite frequency bandwidth, and each carrier may have a limited extent of resources for carrying communications between the donor eNodeB 36 and one or more served UEs including relay-UE 44.

As further noted above, repeatedly engaging in X2 communication via the wireless backhaul connection provided by relay-UE 44 and donor eNodeB 36 may cause the carrier on which donor eNodeB 36 serves relay-UE 44 and perhaps other UEs to become heavily loaded. And difficulty can arise when a carrier on which a donor eNodeB is serving a relay-UE is heavily loaded. In particular, as noted, that heavy load may result in delayed transmission of communications between the donor eNodeB and the relay-UE, which could pose problems with X2 or other various communications passing to and from relay eNodeB 38. For example, as further noted, delays in communication with relay eNodeB 38 could result in issues such as delayed or dropped data packets, as well as delays in handover, paging, bearer setup, or the like.

The present method and system may help address this or other problems by controlling a UE that is ping-ponging between being served by different eNodeBs in order to reduce or eliminate the ping-ponging. For example, responsive to determining that a UE is ping-ponging between being served by different eNodeBs, and responsive to determining that one of the eNodeBs is a relay eNodeB, another eNodeB may cause the UE to operate on a carrier on which the relay eNodeB does not provide service.

Features of this method and system can be carried out at eNodeB 48 for instance. In practice, eNodeB 48 may be configured to determine that UE 40 is ping-ponging between being served by eNodeB 48 and relay eNodeB 38. In order to determine that UE 40 is ping-ponging, eNodeB 48 may maintain in data storage a record of each handover in which eNodeB 48 is the source or target eNodeB. Within the data storage, a UE identifier may be associated with each handover record. The UE identifier may be used to identify each UE that has been handed over and may include, for instance, an International Mobile Subscriber Identity (IMSI) or an International Mobile Equipment Identity (IMEI). The data storage may further include a timestamp associated with each handover record. The timestamp may indicate a time associated with each handover, such as a time when each handover is initiated or completed.

Based on its handover record, eNodeB 48 may determine that UE 40 is ping-ponging, for example, by determining that UE 40 has requested handovers at a rate above a threshold rate. In order to detect a rate of handover of UE 40, eNodeB 48 may determine a number of handoff records in its data storage associated with the UE identifier of UE 40 and the timestamp associated with each handoff record. Based on this information, eNodeB 48 may determine whether UE 40 has requested handover at a rate above a threshold rate for a given period of time. The threshold rate, for example, may be 3 handover requests within a 15 minute period of time. Other threshold rates are possible as well.

Additionally or alternatively, eNodeB 48 may determine, based on its handover record, that UE 40 is ping-ponging by determining that UE 40 has requested a handover within a threshold low period of time after attaching with eNodeB 48. For example, when UE 40 is handed over to eNodeB 48, eNodeB 48 may refer to its handover record to determine the time at which UE 40 last initiated an attach process with eNodeB 48. As such, eNodeB 48 may determine that UE 40 is ping-ponging if an elapsed time since the last initiated attach process is below a threshold amount of time. The threshold amount of time, for example, may be 5 minutes. Other threshold times are possible as well.

In addition to determining that UE 40 is ping-ponging between being served by eNodeB 48 and another eNodeB, eNodeB 48 may be configured to determine whether the other eNodeB is a relay eNodeB. In order to make such a determination, eNodeB 48 may maintain a neighbor list of nearby eNodeBs, which eNodeB 48 may refer to when communicating with neighboring eNodeBs. Within the neighbor list, neighboring eNodeBs may be associated with a relay identifier indicating whether that particular eNodeB is a relay eNodeB. The eNodeB 48 may obtain the relay identifier for a particular eNodeB from an MME in communication with the particular eNodeB, from a UE requesting handover to the particular eNodeB, or from the particular eNodeB itself, for instance. In some embodiments, eNodeB 48 may update the relay identifiers within its neighbor list during normal operation (e.g., without having detected that UE 40 is ping-ponging between being served by eNodeB 48 and another eNodeB). Additionally or alternatively, eNodeB 48 may update the relay identifiers within its neighbor list in response to detecting that UE 40 is ping-ponging between being served by eNodeB 48 and another eNodeB.

In practice, eNodeB 48 may determine that UE 40 is ping-ponging between being served by eNodeB 48 and being served by relay eNodeB 38. Further, eNodeB 48 may refer to its neighbor list to determine a relay identifier associated with relay eNodeB 38. Based on the relay identifier, eNodeB 48 may determine that relay eNodeB 38 is a relay eNodeB.

Further, responsive to determining that UE 40 is ping-ponging between being served by eNodeB 48 and a relay eNodeB (e.g., relay eNodeB 28), eNodeB 48 may determine a carrier on which eNodeB 48 provides service and on which relay eNodeB 38 does not provide service. Based on eNodeB 48 providing service on the determined carrier and relay eNodeB 38 not providing service on the determined carrier, eNodeB 48 may then cause UE 40 to be served by eNodeB 48 on the determined carrier.

In order to determine a carrier on which eNodeB 48 provides service and on which relay eNodeB 38 does not provide service, eNodeB 48 may be configured to consider a list of carriers on which eNodeB 48 provides service as well as a list of carriers on which relay eNodeB 38 provides service. Based on these carrier lists, eNodeB 48 may determine one or more carriers on which eNodeB 48 provides service and on which relay eNodeB 38 does not provide service.

Carrier lists indicating the respective carriers on which each neighboring eNodeB provides service may be maintained in the data storage of eNodeB 48, for instance within the neighbor list of eNodeB 48. In order to maintain the carrier lists within its neighbor list, eNodeB 48 may query an MME in communication with neighboring eNodeBs for a list of carriers on which the neighboring eNodeBs provide service. Alternatively, eNodeB 48 may query each neighboring eNodeB for a list of its supported carriers. Each carrier may be identified by one or more globally unique identifiers per industry standard, so that various network entities can refer to particular carriers by those identifiers. Thus, eNodeB 48 may update its neighbor list to associate the global identifier of a carrier with each neighboring eNodeB that supports the carrier.

In practice, eNodeB 48 may determine one or more carriers on which eNodeB 48 provides service and on which relay eNodeB 38 does not provide service by referencing a list of carriers on which relay eNodeB 38 provides service stored in the neighbor list of eNodeB 48. Such a determination may be made, for example, by determining one or more global identifiers of carriers on which eNodeB 48 provides service that are not included in the list of carriers on which relay eNodeB 38 provides service.

Upon determining one or more carriers on which eNodeB 48 provides service and on which relay eNodeB 38 does not provide service, eNodeB 48 may cause UE 40 to be served by eNodeB 48 on one or more of the determined carriers. In a representative process, for instance, eNodeB 48 may transmit to UE 40 an RRC connection reconfiguration message that specifies one or more carriers on which eNodeB 48 will be serving UE 40, identifying each carrier by its global identifier so that UE 40 will be able to tune to the carrier. The RRC connection reconfiguration message may specify a single carrier, in which case eNodeB 48 may allocate resources on that carrier for use to carry communications to and from UE 40. Alternatively, the RRC connection reconfiguration message may specify multiple carriers from either contiguous frequency bands or non-contiguous frequency bands, in which case eNodeB 48 may allocate resources on those multiple carriers at once to carry communications to and from UE 40.

By causing UE 40 to be served by eNodeB 48 on one or more carriers on which eNodeB 48 provides service and on which relay eNodeB 38 does not provide service, UE 40 is less likely to ping-pong between being served by eNodeB 48 and relay eNodeB 38. For instance, as noted above, the ping-ponging may occur as a result of UE 40 detecting fluctuations in the reference signal strengths of eNodeB 48 and relay eNodeB 38. If UE 40 is being served on a carrier on which relay eNodeB 38 does not provide service, then UE 40 may not monitor a reference signal from relay eNodeB 38 without tuning away from its carrier. Accordingly, this may reduce or eliminate the ping-ponging, thereby reducing the load on one or more carriers of donor eNodeB 36 and improving user experience.

While features of this method and system have been described as being carried out by eNodeB 48, various other network entities may carry out some or all of these features as well. For instance, as noted above, donor eNodeB 36 may serve other UEs in addition to relay-UE 44. As such, donor eNodeB 36 may serve UE 40, and UE 40 may ping-pong between being served by donor eNodeB 36 and being served by relay eNodeB 38. In this arrangement, the above features may be carried out be donor eNodeB 36.

Figure 3:
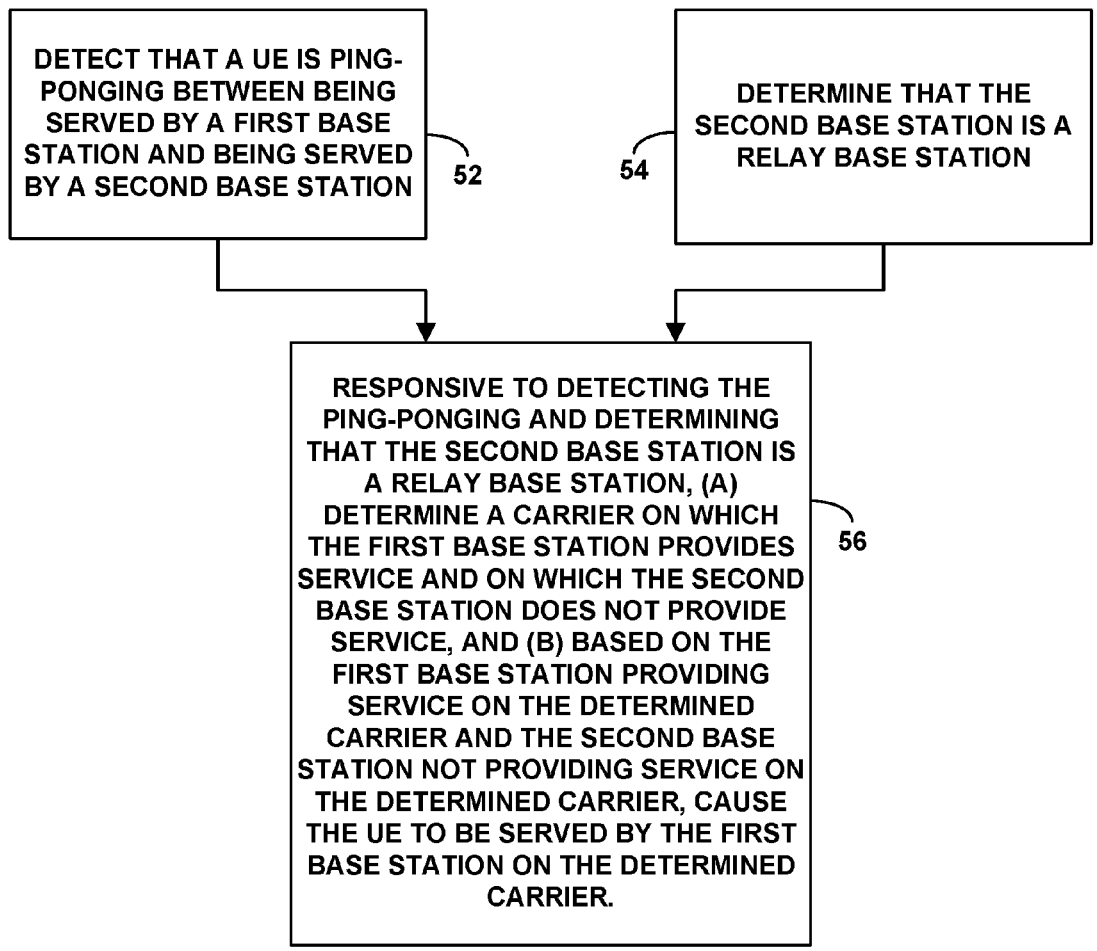
FIG. 3 is a flow chart depicting operations in accordance with the disclosure.

FIG. 3 is next a flow chart depicting operations of an example method in line with the discussion above, to control service of a UE by a base station (e.g., an eNodeB). As shown in FIG. 3, at block 52, a first base station detects that a UE is ping-ponging between being served by the first base station and being served by a second base station. Further, at block 54, the first base station determines that the second base station is a relay base station. For example, the first base station may determine that the second base station is a relay base station based on data accessed from a neighbor list of the first base station.

In some examples, the first base station may determine that the second base station is a relay base station before or after detecting the ping-ponging. In other examples, the first base station may determine that the second base station is a relay base station in response to detecting the ping-ponging.

Next at block 56, responsive to detecting the ping-ponging and determining that the second base station is a relay base station, the first base station (a) determines a carrier on which the first base station provides service and on which the second base station does not provide service, and (b) based on the first base station providing service on the determined carrier and the second base station not providing service on the determined carrier, the first base station causes the UE to be served by the first base station on the determined carrier. As discussed above, the first base station may determine a carrier on which the first base station provides service and on which the second base station does not provide service based on data from the second base station, data from an MME, and/or data from a neighbor list of the first base station.

Further in line with the discussion above, the second base station may be a relay base station as part of a relay, and the first base station may be a donor base station configured to communicate with the relay. Specifically, the first base station may serve a relay-UE of the relay over an air interface defining a wireless backhaul connection for the relay. In other arrangements, the first base station may be any base station other than the donor base station for the relay. Also as discussed above, the first base station and the second base station may be LTE eNodeBs of an LTE network.

Figure 4:
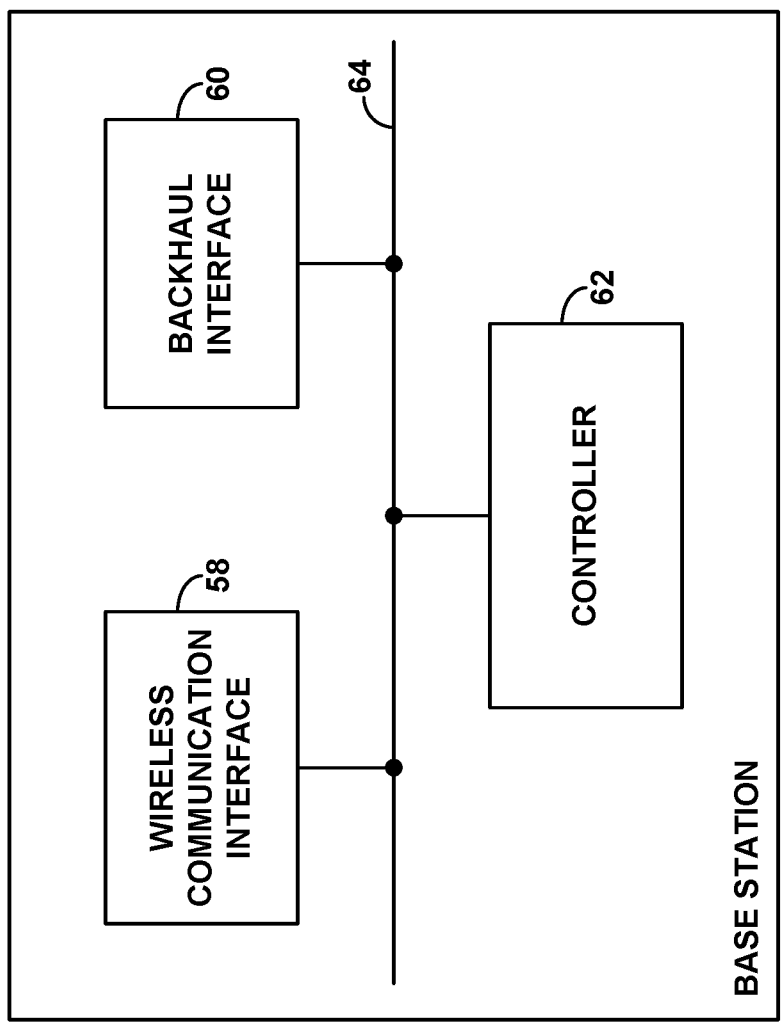
FIG. 4 is a simplified block diagram of a base station.

Finally, FIG. 4 is a simplified block diagram of an example base station, which could function as any of the base stations (e.g., eNodeBs) in the arrangements discussed above. As shown in FIG. 4, the example base station includes a wireless communication interface 58, a backhaul interface 60, and a controller 62, all of which may be communicatively linked together by a system bus, network, or other connection mechanism 64.

In this arrangement, the wireless communication interface 58 may be configured to provide cellular coverage and to engage in air interface communication with served UEs. As such, wireless communication interface 58 may comprise an antenna structure (not shown), which may be tower mounted or may take other forms, and associated components such as a power amplifier and a wireless transceiver, so as to facilitate transmission and reception of bearer and control data over the air interface in accordance with an air interface protocol such as LTE or others as noted above. Further, backhaul interface 60 may comprise a wired or wireless interface, such as an Ethernet network communication interface, configured to support communication with other entities, such as X2 communication with other base stations for instance.

Controller 62 may then comprise control logic to cause the base station to carry out particular functions including those discussed above. As such, the controller 62 may take various forms, including but not limited to one or more processors (e.g., general purpose microprocessors and/or dedicated processing units) and data storage holding program instructions executable by the processors(s) to carry out various operations described herein.

These operations may include, among others discussed above, (i) detecting that a UE is ping-ponging between being served by the base station and being served by a neighboring base station, (ii) determining that the neighboring base station is a relay base station, and (iii) responsive to detecting the ping-ponging, (a) determining a carrier on which the base station provides service and on which the neighboring base station does not provide service, and (b) based on the neighboring base station being a relay base station and not providing service on the determined carrier, causing the base station to serve the UE on the determined carrier.

Exemplary embodiments have been described above. Those skilled in the art will understand, however, that changes and modifications may be made to these embodiments without departing from the true scope and spirit of the invention.

What is claimed is:

1. A method for controlling a user equipment device (UE), wherein the UE is situated in both a coverage area of a first base station and a coverage area of a second base station, the method comprising:

detecting that the UE is ping-ponging between being served by the first base station and being served by the second base station; and responsive to detecting the ping-ponging, performing a carrier frequency selection process comprising (a) determining a carrier frequency on which the first base station provides service and on which the second base station does not provide service, and (b) based on the first base station providing service on the determined carrier frequency and the second base station not providing service on the determined carrier frequency, causing the UE to be served by the first base station on the determined carrier frequency.

2. The method of claim 1, wherein the first base station is a donor base station configured to communicate with a relay, wherein the relay comprises the second base station and a relay user equipment device (relay-UE), and wherein the first base station serves the relay-UE over an air interface defining a wireless backhaul connection for the relay.

3. The method of claim 1, further comprising determining that the second base station is a relay base station, wherein determining that the second base station is a relay base station comprises:
 accessing data from a neighbor list of the first base station, wherein the neighbor list includes information indicating whether one or more neighboring base stations is a relay base station; and
 based on the accessed data, determining that the second base station is a relay base station.

4. The method of claim 1, wherein determining the carrier frequency on which the first base station provides service and on which the second base station does not provide service comprises:
 receiving data from the second base station indicating one or more carrier frequencies on which the second base station provides service; and
 based on the received data, determining the carrier frequency on which the first base station provides service and on which the second base station does not provide service.

5. The method of claim 1, wherein determining the carrier frequency on which the first base station provides service and on which the second base station does not provide service comprises:
 receiving data from a mobility management entity (MME) indicating one or more carrier frequencies on which the second base station provides service; and
 based on the received data, determining the carrier frequency on which the first base station provides service and on which the second base station does not provide service.

6. The method of claim 1, wherein determining the carrier frequency on which the first base station provides service and on which the second base station does not provide service comprises:
 accessing data from a neighbor list of the first base station, wherein the neighbor list includes information indicating one or more frequencies on which one or more neighboring base stations provide service; and
 based on the accessed data, determining the carrier frequency on which the first base station provides service and on which the second base station does not provide service.

7. The method of claim 1, wherein causing the UE to operate on the determined carrier frequency comprises sending to the UE a Radio Resource Control (RRC) connection reconfiguration message directing the UE to operate on the determined carrier frequency.

8. A base station comprising:
 a wireless communication interface through which to engage in communication with a user equipment device (UE) served by the base station; and
 a controller configured to carry out operations including:
  detecting that the UE is ping-ponging between being served by the base station and being served by a different, neighboring base station,
  determining that the neighboring base station is a relay base station, and
  responsive to detecting the ping-ponging, (a) determining a carrier frequency on which the base station provides service and on which the neighboring base station does not provide service, and (b) based on the neighboring base station being a relay base station and not providing service on the determined carrier frequency, causing the base station to serve the UE on the determined carrier frequency.

9. The base station of claim 8, wherein the base station is a donor base station configured to communicate with a relay, wherein the relay comprises the neighboring base station and a relay user equipment device (relay-UE), and wherein the base station serves the relay-UE over an air interface defining a wireless backhaul connection for the relay.

10. The base station of claim 8, wherein determining that the neighboring base station is a relay base station comprises:
 accessing data from a neighbor list of the base station, wherein the neighbor list includes information indicating whether one or more neighboring base stations is a relay base station; and
 based on the accessed data, determining that the neighboring base station is a relay base station.

11. The base station of claim 8, wherein determining the carrier frequency on which the base station provides service and on which the neighboring base station does not provide service comprises:
 receiving data from the neighboring base station indicating one or more carrier frequencies on which the neighboring base station provides service; and
 based on the received data, determining the carrier frequency on which the base station provides service and on which the neighboring base station does not provide service.

12. The base station of claim 8, wherein determining the carrier frequency on which the base station provides service and on which the neighboring base station does not provide service comprises:
 receiving data from a mobility management entity (MME) indicating one or more carrier frequencies on which the neighboring base station provides service; and
 based on the received data, determining the carrier frequency on which the base station provides service and on which the neighboring base station does not provide service.

13. The base station of claim 8, wherein determining the carrier frequency on which the base station provides service and on which the neighboring base station does not provide service comprises:
 accessing data from a neighbor list of the serving base station, wherein the neighbor list includes information indicating one or more carrier frequencies on which one or more neighboring base stations provide service; and
 based on the accessed data, determining the carrier frequency on which the base station provides service and on which the neighboring base station does not provide service.

14. The base station of claim 8, wherein the base station is an evolved Node-B (eNodeB) of an Orthogonal Frequency Division Multiple Access (OFDMA) network.

15. The base station of claim 14, wherein causing the base station to serve the UE on the determined carrier frequency comprises sending to the UE a Radio Resource Control (RRC) connection reconfiguration message directing the UE to operate on the determined carrier frequency.

16. A system for controlling a user equipment device (UE), the system comprising:
a donor base station; and
a relay,
wherein the relay comprises a relay user equipment device (relay-UE) and a relay base station, wherein the donor base station serves the relay-UE over an air interface defining a wireless backhaul connection for the relay, and
wherein the donor base station is configured to detect that the UE is ping-ponging between being served by the donor base station and being served by the relay base station, and responsive to detecting the ping-ponging:
determine a carrier frequency on which the donor base station provides service and on which the relay base station does not provide service, and
based on the relay base station not providing service on the determined carrier frequency, cause the UE to operate on the determined carrier frequency.

17. The system of claim 16, wherein determining the carrier frequency on which the donor base station provides service and on which the relay base station does not provide service comprises:
receiving data from the relay base station indicating one or more carrier frequencies on which the relay base station provides service; and
based on the received data, determining the carrier frequency on which the donor base station provides service and on which the relay base station does not provide service.

18. The system of claim 16, wherein determining the carrier frequency on which the donor base station provides service and on which the relay base station does not provide service comprises:
receiving data from a mobility management entity (MME) indicating one or more carrier frequencies on which the relay base station provides service; and
based on the received data, determining the carrier frequency on which the donor base station provides service and on which the relay base station does not provide service.

19. The system of claim 16, wherein determining the carrier frequency on which the donor base station provides service and on which the relay base station does not provide service comprises:
accessing data from a neighbor list of the donor base station, wherein the neighbor list includes information indicating one or more carrier frequencies on which one or more neighboring base stations provide service; and
based on the accessed data, determining the carrier frequency on which the donor base station provides service and on which the relay base station does not provide service.

20. The method of claim 1, further comprising determining that the second base station is a relay base station, wherein the carrier frequency selection process is carried out responsive to both detecting the ping-ponging and determining that the second base station is a relay base station.

* * * * *